D. George,
Hollow Auger,
N° 5,487.  Patented Mar. 28, 1848.
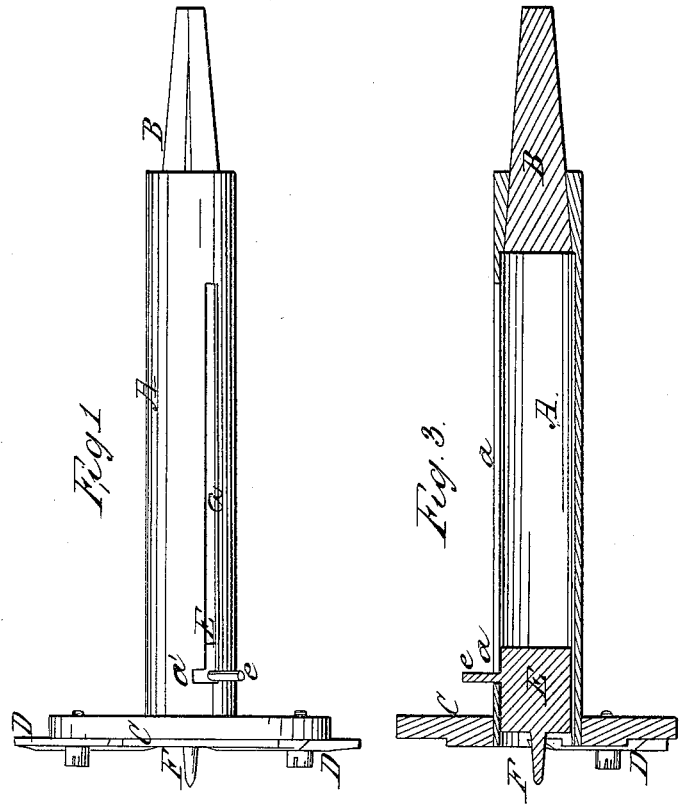
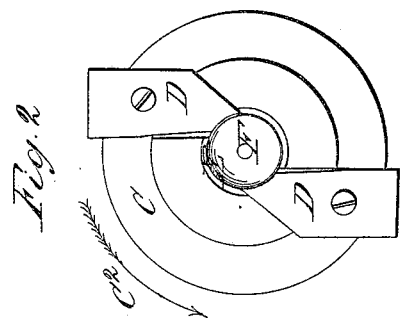

UNITED STATES PATENT OFFICE.

DAVID GEORGE, OF GRANVILLE, OHIO.

HOLLOW AUGER.

Specification of Letters Patent No. 5,487, dated March 28, 1848.

*To all whom it may concern:*

Be it known that I, DAVID GEORGE, of Granville, in the county of Licking and State of Ohio, have invented certain new and useful Improvements in Hollow Augers for Boring Round Tenons on the Ends of the Spokes of Carriage-Wheels, and for other Purposes, of which the following is a full, clear, and exact description, reference being had to the annexed drawings of the same, making a part of this specification, of which—

Figure 1 is a side elevation. Fig. 2 is a front elevation showing the cutters. Fig. 3 is a vertical longitudinal section.

When the same parts occur in the different figures they are designated by the same letters of reference.

The nature of my invention and improvement consists in arranging and combining with the machine in common use for boring round tenons, an adjusting sliding centering-point, which being forced into the wood at the center of the part of which it is required to form the tenon guides the cutters accurately, until a sufficient length of the tenon is formed to enter the tube, after which it guides itself independent of the centering point in the manner of tools in common use for similar purposes.

By the use of my invention the operation of describing a circle upon the end of the piece on which the tenon is required to be cut and then shaving the wood down to the circle to start the cutters as is done in using the common hollow auger, is rendered unnecessary, and thus considerable labor is saved and the work is done with superior accuracy.

My auger is composed of a cylindrical tube A having a longitudinal slit *a* therein; in the front end of this slit a notch *a'* is formed. In the rear end of the tube a solid plug B is secured, the outer end of which is made square and tapering, that it may fit into a corresponding socket in the holder of the brace, or bitstock, by which, when in use, it is turned. On the other, or front end of the tube, a fillet or collar C is secured upon the face of which the cutters D D are fastened by screws or otherwise. Inside of the tube a cylindric plug E is placed, of such diameter that it will slide freely therein and of any suitable length. In one side of the plug a stud or stop *e* is inserted which protrudes through and slides in the slit *a* of the tube. In the center of the front end of the sliding plug, the centering points F is se-secured; which is of such length that it will project about three sixteenths of an inch in advance of the cutters, when the sliding plug is moved forward until arrested by the stop *e*, coming into contact with the front end of the slit *a*. The centering point F is about one eighth of an inch in diameter where it enters the plug, and tapers gradually from thence to the point, which is about one sixteenth of an inch in diameter and has an angular point.

The operation of this tool is as follows. Being secured by its shank in a common brace in the usual manner, the sliding plug is moved to the front end of the tube and the stop *e* turned into the notch *a*. The centering point which now projects before the cutters is placed on the end of the wood, and thrust into it at the point around which it is required to form the tenon. The cutters are now turned in the direction indicated by the arrow $C^2$ Fig. 2 by which the wood is cut off around the tenon, until the end of the tenon comes into contact with the sliding plug E, held in its place by the stop *e* in the notch *a'*. The auger is now drawn back a little and the sliding plug with the centering point moved to the back end of the tube; the front end of the tube is again placed upon the end of the tenon already formed, which now acts as a center and guide to the cutters, and the cutting is resumed and continued until the tenon is completed. In this way the tenon is accurately formed of any given part of the end of the piece of timber.

What I claim as my invention and desire to secure by Letters Patent, is,

The combination of the sliding centering point and plug with the tube and cutter, whether used with the above described set tube and cutters, or any other apparatus for boring or cutting, substantially as set forth.

DAVID GEORGE.

Witnesses:
SAMUEL BANCROFT,
HALL ROBERTSON.